Oct. 10, 1950          S. R. PUTNAM          2,525,313
MIXER VALVE
Filed April 16, 1947                                   3 Sheets-Sheet 1
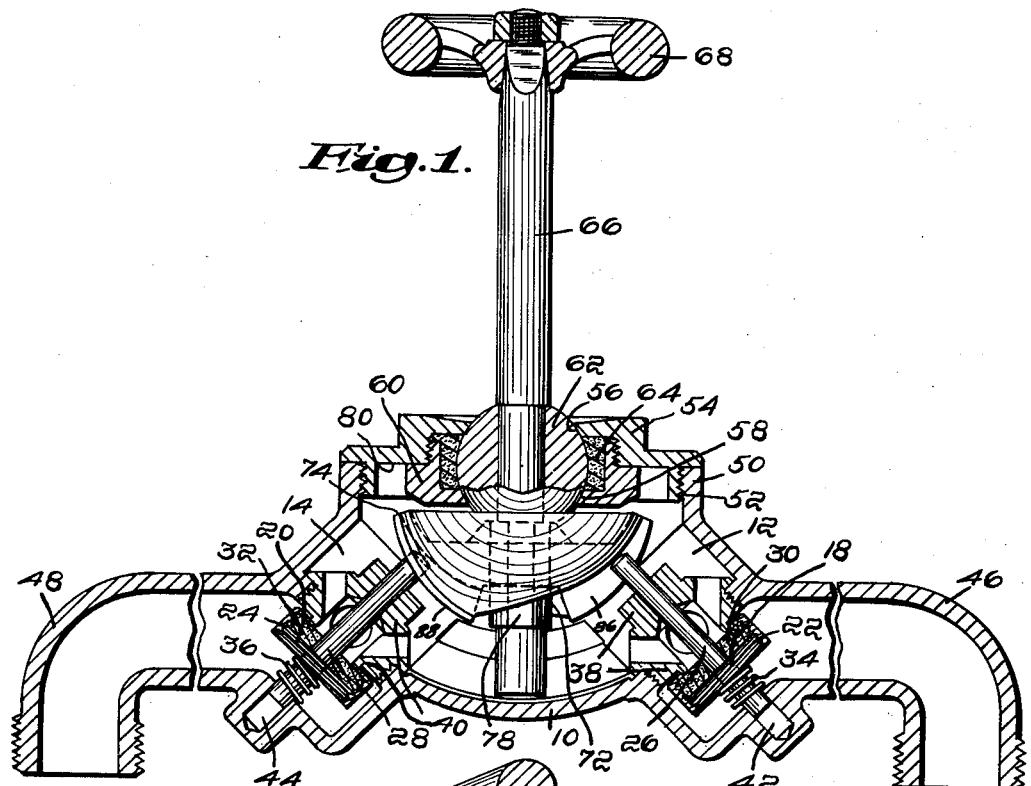
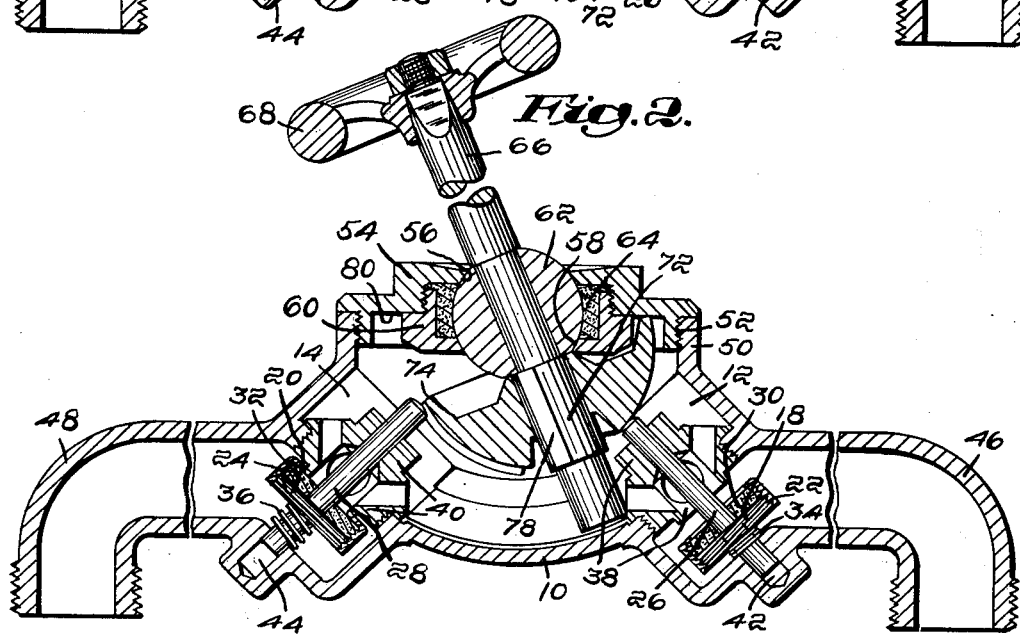
Inventor:
Stephen R. Putnam
by Munn V. Hamilton
Attorney Oct. 10, 1950 S. R. PUTNAM 2,525,313
MIXER VALVE
Filed April 16, 1947 3 Sheets-Sheet 2
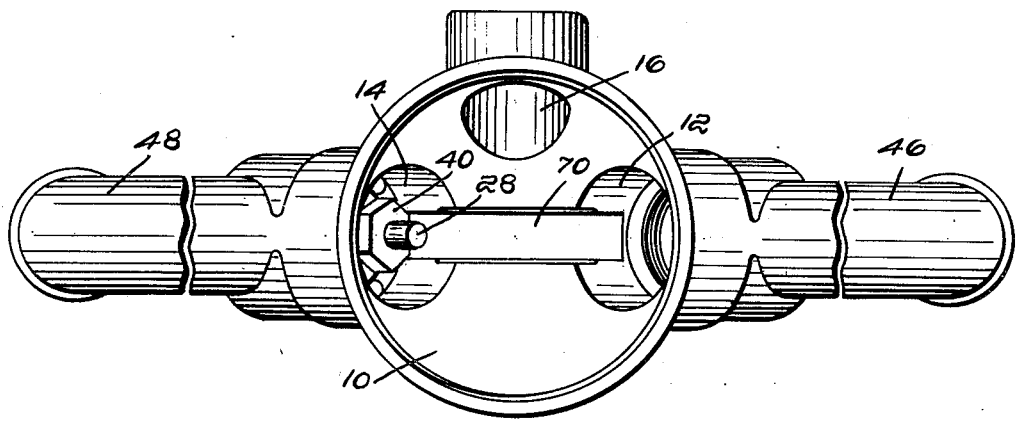
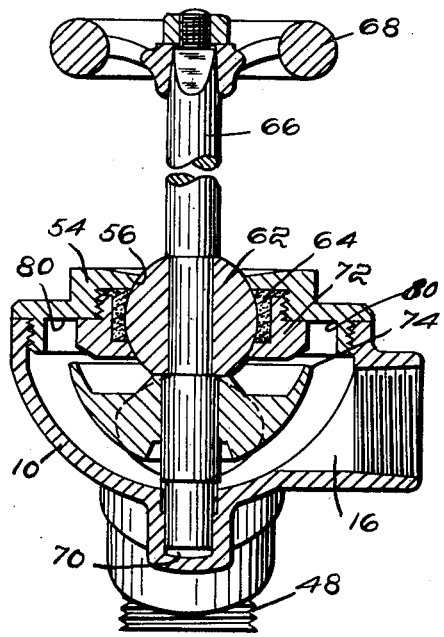
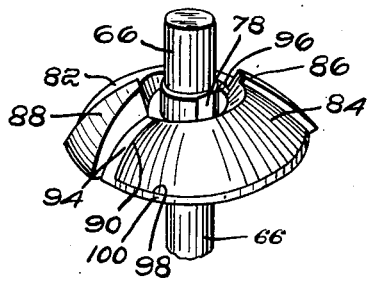
Inventor:
Stephen R. Putnam
by
Attorney Oct. 10, 1950   S. R. PUTNAM   2,525,313
MIXER VALVE Filed April 16, 1947   3 Sheets-Sheet 3

Inventor:
Stephen R. Putnam
by Munn H. Hamilton
Attorney

Patented Oct. 10, 1950

2,525,313

UNITED STATES PATENT OFFICE 2,525,313

MIXER VALVE

Stephen R. Putnam, Quincy, Mass.

Application April 16, 1947, Serial No. 741,814

8 Claims. (Cl. 277—20)

This invention relates to an improved mixing valve of the type employed to mix two or more fluid materials and to discharge the resulting mixture from a single outlet member in a condition such that the characteristics of one fluid are modified by the characteristics of another. More particularly the invention is concerned with means for mixing hot and cold water as utilized in sinks, washbasins, shower baths, and similar equipment.

A considerable number of structures designed for such purposes have already been proposed in the art. Almost all of these devices however have failed, and single conduit valves are in general use at the present time. It is found that the prior art mechanisms are objectionable chiefly because of the use of a relatively large number of elements which either get out of order rather easily, or are lacking in flexibility of manipulation. The cost of such devices has also been excessive.

An object of the invention therefore is to provide a practical mixing valve of greatly simplified and yet rugged construction which will not easily get out of order over long periods of use. It is also an object of the invention to combine a carefully limited number of mixing valve elements to provide an exceedingly cheap and easily assembled unit especially adapted to household use. It is still a further object of the invention to provide an arrangement of parts which is so chosen that by movement of a single handle member, selective flow of any one of a plurality of fluids may be obtained in any desired volume; the rate of flow of a mixture of equal amounts of the fluids may be varied at will; and the proportions of the component parts of the mixture may be variably selected either with or without changing the rate of flow of the mixture. Other objects will be apparent in the course of the following detailed description of the invention.

I have found that the desired functions outlined in the foregoing discussion may be carried out to a very satisfactory degree by combining a specially designed dual cam member with means for swinging the cam member about a pivot and at the same time permitting the cam to be rotated about its axis in any position into which it may be swung. The cam member is distinguished by the fact that it includes a pair of cam surfaces formed on a portion of a hemispherical body whose curvature is chosen by reference to the pivot point about which the cam member may be swung. These cam surfaces are arranged to engage with valve stem elements within a closed mixing chamber and thus control flow of fluids therethrough.

In the accompanying drawings, I have illustrated a mixing valve structure constituting a preferred embodiment of the invention, in which Fig. 1 is a view in cross section of the mixing valve;

Fig. 2 is another cross-sectional view illustrating the valve in one operative position;

Fig. 3 is a plan view of the mixing valve casing with cam controlling mechanism removed;

Fig. 4 is another cross-sectional view taken transversely of the supply outlets;

Fig. 5 is a perspective view showing the cam and a portion of the shaft;

Figure 6:
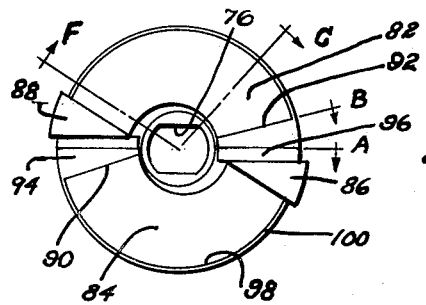
Fig. 6 is a top plan view of the cam member shown in Fig. 5.
Figure 7:
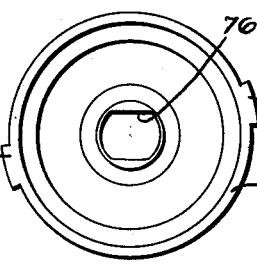
Fig. 7 is a bottom plan view of the cam member.
Figure 8:
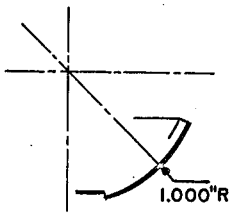
Fig. 8 is a diagrammatic view illustrating the arc of curvature of the cam member taken on the line A of Fig. 6.
Figure 9:
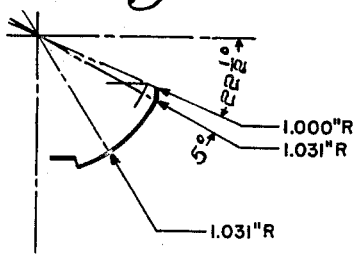
Fig. 9 is a similar view of the cam taken on the line B of Fig. 6.
Figure 10:
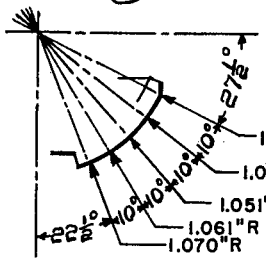
Fig. 10 is a similar view taken on the line C of Fig. 6.
Figure 11:
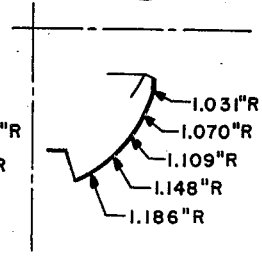
Fig. 11 is a similar view taken on the line F of Fig. 6.
Figure 12:
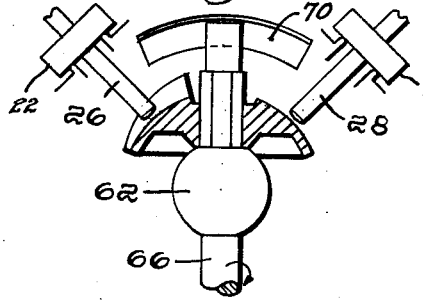

Figs. 12–15, inclusive, are diagrammatic views further illustrating various operating positions of the valve.

Referring more in detail to the drawings, 10 denotes a casing member having a mixing chamber, with which communicate inlet ports 12 and 14 and an outlet port 16 as is more clearly indicated in Fig. 3. Mounted in the inlet ports 12 and 14 are two valves consisting of discs 18 and 20 whose peripheries are threaded to respective collars 22 and 24. The discs are mounted on valve stems 26 and 28 and against the discs are secured washer members 30 and 32. Springs 34 and 36 resiliently urge the valves against valve seats 38 and 40 threaded in the casing. The outer ends of the valve stems 26 and 28 are guided in holes 42 and 44 while the inner ends of the valves are guided by openings in the valve seats 38 and 40. The tips of the valve stems project into the mixing chamber in spaced-apart relation and preferably in a position such that the axes of the valve stems fall along lines converging at right angles to one another.

Fluid materials are introduced through conduits 46 and 48 which extend outwardly from the opposite sides of the casing and when allowed to enter the chamber by the valves are mixed and immediately discharged out through the outlet port 16. The valves are controlled by the movement of a cam member acting against the tips of the valve stems 26 and 28. This cam member may, for example, be mounted on a shaft member pivotally mounted through the side of the casing 10 in the manner shown in Figs. 1, 2 and 4.

The casing is formed with a circular rim 50, the inner peripheral surface of which is threaded to receive a similarly threaded flange 52 of a bonnet 54. The bonnet 54 is formed with an internal spherical seat portion 56 which together with a similar spherical seat portion 58 formed on a retaining nut 60, provides a socket for a ball pivot element 62. Gland packing 64 is also held by the retaining nut 60 and serves to keep fluid material from escaping around the ball pivot 62. The position of the ball pivot may be so chosen that it lies substantially in equidistant relation with respect to the extremities of the two valve stems.

A shaft member 66 is supported by the ball pivot 62 in a position such that the axis of the shaft passes through the center of the ball pivot. At the outer extremity of the shaft 66 is a handle 68. The inner extremity of the shaft is engaged in a curved channel 70 formed along the inner surface of the casing at points lying between the two valve stems. The width of the channel corresponds to the diameter of the shaft 66 so that the latter element is constrained to move in a single plane when swung about the ball pivot 62.

Mounted on the shaft 66 between the ball pivot and the inner extremity of the shaft is the cam member of the invention which is formed from a portion of a spherical body. The cam member is recessed at its under side to form a central bearing 72 and in spaced relation thereto a circumferentially extending skirt 74. The bearing 72 is formed with two spaced-apart flattened sides 76 which are adapted to engage with two correspondingly flattened sides 78 formed on the shaft 66 so that rotation of the shaft about its axis will produce corresponding rotation of the cam member. Swinging the shaft 66 about the ball pivot 62 moves the cam member through a short arc which is limited at either end by contact of the cam skirt 74 with an inner annular face 80 on the bonnet 54. One such position of contact is illustrated in Fig. 2.

Essentially the cam comprises two more or less identical cam surfaces 82 and 84 developed on opposite halves of the spherical body portion. Two arcuate stops 86 and 88 separate the surfaces 82 and 84 from one another as shown in Fig. 5. The cam surfaces are derived by taking the distance between the center of the ball pivot and one of the valve stem tips, and using this distance as a basic radius to describe an arc whose center coincides with the center of the ball pivot. The arc thus formed is an arc of a great circle passing through the center of the ball pivot. Such an arc marks a boundary line along which one cam surface begins, and the cam member at every point along this arc is adapted to extend into contact with one of the valve stem tips. In Fig. 6 such a boundary line is denoted by numeral 90 and indicates the beginning of cam surface 84. Numeral 92 indicates an arc of a similar great circle which constitutes a corresponding boundary line for cam surface 82. All portions of the two cam surfaces extending from the base to the top of the cam member and which have a radius corresponding to that of this boundary line will therefore just meet with their respective valve stem tips in a starting position to begin depressing the valve stems.

Beginning with boundary lines 90 and 92, the cam surfaces are developed from a series of varying curves having a common origin corresponding with that of the ball pivot, and using as radii the basic radius of the great circle to which are added small incremental values, as has been indicated in Figs. 8, 9, 10 and 11. The effect of this is to form similar cam portions which are brought progressively nearer to the valve stem tips, thus making it possible to depress the valve stems in varying degree, according to the amount of rotation of the shaft about its own axis. The maximum incremental values are found along the line F of Fig. 6. This line therefore bounds the ending of the cam surfaces. The maximum amount of lift exerted by the cam surfaces may for example be approximately $\frac{5}{32}$ of an inch, which affords a sufficiently wide range of valve operation.

The cam surfaces described are adapted to place the valves in varying position of operation. It is however essential first to provide for completely shutting off the valves. This may be done for example by providing between the boundary lines 90 and 92 and their respective adjacent stop members 86 and 88, recessed areas 94 and 96 whose arcs of curvature at all points therealong are characterized by radii smaller than the basic radius of the great circle. These recessed areas extend from the base to the top of the cam. Along these areas 94 and 96 of the cam therefore no contact with the valve stem tips can be made. By rotating the shaft about its axis into a position where the valve stems engage against the sides of the stop members, the recessed areas 94 and 96 fall directly under, or in front of, the valve stem tips and the valves are completely shut off and will remain so in any position in the casing channel into which the shaft may be swung.

To operate one valve independently of the other, a second recessed annular area is provided, extending around the base of the cam. This annular area is defined by two small circles, one passing through the base of the cam and the other slightly above it in parallel relation. All points along the circumference of each respective small circle are equidistant from the center of the ball pivot. Numeral 98 indicates the boundary line defined by the upper small circle and numeral 100 indicates the annular recessed area occurring between this circle and the circle through the base of the cam as shown in Fig. 5. The function of this recessed area is to provide clearance between itself and a valve stem tip when the shaft and cam are swung about the pivot into an extreme position at one side or the other of the casing channel. With the cam member held in such an extreme position, only one cam surface can operate its respective valve stem. The recessed area at the base of the other cam surface must remain out of contact with its adjacent valve stem in all positions occurring when the shaft is rotated about its axis. This arrangement may be reversed by swinging the shaft to the opposite end of the casing channel. As a result either valve may be selectively opened at any time to any desired degree while the other remains fully closed.

The mixing valve when installed is normally placed in a fully closed position which is effected by grasping the handle and rotating the shaft clockwise about its axis until the stop members strike against the sides of the valve stems. Such a fully closed position of the valve will be maintained regardless of the position which the shaft is swung into in the casing channel. This will be more clearly seen from an inspection of Figs. 8 and 12, in which it may be observed that with a radius less than the radius of the great circle (1.000) as illustrated, pivoting the shaft can make no contact between the valves and cam surface shown.

Figure 13:
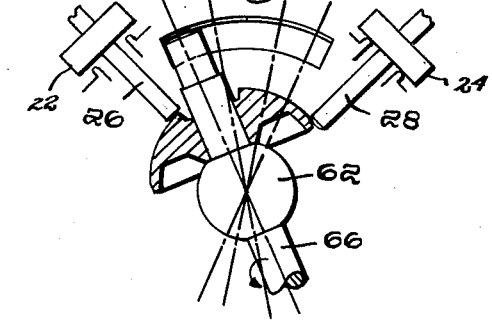

Now assuming that it is desired to open only one valve, the handle is swung into an extreme position such as that shown in Fig. 13 at the end of the casing channel as limited by the cam skirt striking against the bonnet face. One extremity of the casing channel may be utilized for a hot water station and the other extremity for a cold water station. The handle is then still held in the position noted and rotated about its axis in a counter-clockwise direction to any desired degree. The valve 26 is thereby depressed in accordance with the lift of the cam surface rotated against its extremity, while the other valve 28 is left unchanged as shown in Fig. 13. This is due to the fact that the end of valve stem 28 is always maintained directly over or in front of the recessed area 100 at the base of the cam, no matter what rotative position is assumed. By swinging the shaft to the opposite side of the casing channel, a reverse effect is obtained with selective operation of the other valve; valve 28 is operated and valve 26 remains closed.

Figure 14:
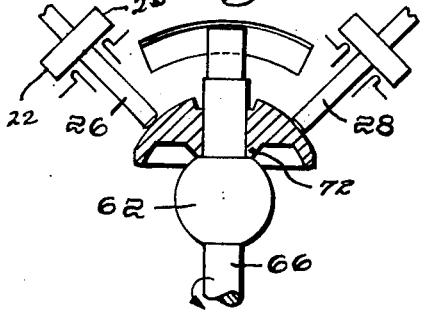

Assuming that it may next be desired to modify the character of fluid obtained from one valve by mixing with an equal amount of fluid from the second valve, the handle is moved into a central position such as that shown in Fig. 14, and then rotated about its own axis. This supplies equal proportions in a variable rate, depending on the degree of rotation. Now by rotating the handle about its axis and swinging out of the central position described, I may vary the proportion while still getting the same volume of fluid released as was the case with the same degree of rotation in either an extreme angular position or central position.

Figure 15:
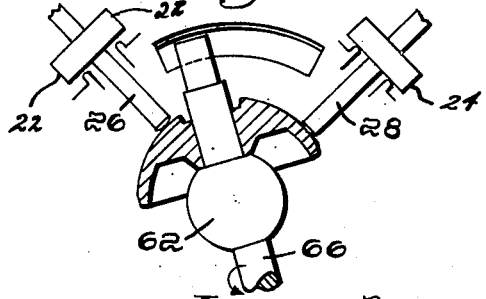

For example, by swinging the shaft about its pivot into a position such as that shown in Fig. 15, the proportions of the mixture may be varied simultaneously without varying the rate of flow. It will also be observed that a larger proportionate amount of fluid from one valve or the other may be alternated by merely swinging the handle from one side to the other. Rotation of the handle without other displacement changes the rate of flow without changing proportions. Also both functions, i. e. changing the proportionate amounts of fluid flowing and the total rate of flow, may be performed simultaneously by imparting rotation to the cam while swinging the cam about its pivot.

From the foregoing description it will be evident that I have provided a simple, rugged mixing valve structure of a very limited number of parts, involving essentially a single cam carried on a pivoted shaft. The structure may be cheaply manufactured and easily assembled; it is free from delicate adjustments and does not readily get out of order.

The invention has been described with reference to a specific structure dealing with a hot and cold water supply. This is not done with the intention of limiting the invention to either the particular structure or functions indicated. It is contemplated that varying forms of the invention may be resorted to, as defined by the scope of the appended claims, and similarly other functions may be carried out. In this connection, I may desire to mix two liquids of different temperatures, consistency or chemical composition, or I may wish to mix more than two liquids by increasing the number of valves which are acted upon. Gases as well as liquids or mixtures of the two may also be used with the valve.

I claim:

1. A mixing valve of the character described comprising a casing having a mixing chamber formed therein, a conduit communicating with the chamber for permitting passage of materials out of said chamber, inlet ports for admitting materials to the chamber, valve means for opening and closing the ports, a shaft pivotally mounted in the casing a cam fixed on the shaft in position to selectively open and close the valve members, the cam including a pair of separated cam surfaces which at two selected points thereon are defined by respective arcs of a great circle whose center lies at the pivot point of the shaft.

2. A mixing valve of the character described comprising a mixing chamber, valve means for controlling movement of materials through the chamber, rotatable cam member for opening and closing the valve means, the cam member being fixed on a pivoted shaft whose extremity extends into the mixing chamber, said chamber being formed with a slot in which the shaft extremity is guided and is constrained to move in only one plane, stop means separating the cam member into two cam surface areas, the stop means operating in response to rotation of the pivoted shaft to limit movement of the cam member in one direction.

3. A mixing valve of the character described, comprising a mixing chamber, valve and spring means for controlling movement of materials through the chamber, said valve means including valve stems extending into the mixing chamber, rotatable cam means cooperating with the valve and spring means for selectively opening and closing the valve means, said cam means being supported on a shaft pivoted at one side of the mixing chamber, the inner extremity of said shaft extending into the mixing chamber said chamber being formed with a slot in to which the shaft extremity extends and is constrained to move in only one plane, said cam means presenting two opposite cam surfaces formed on a hemispherical body, each of said cam surfaces being defined at one side thereof by a great circle whose center lies in a plane passing through the center of the said pivoted shaft, each of the cam surfaces further being defined along another side thereof by a small circle formed by a plane passing through the hemispherical body at a point outside the center of the pivoted shaft.

4. A mixing valve of the character described, comprising a mixing chamber, valve and spring means for controlling movement of material through the chamber, said valve means including valve stems extending into the mixing chamber, rotatable cam means cooperating with the valve and spring means for selectively opening and closing the valve means, said cam means being supported on a shaft pivoted at one side of the mixing chamber, the inner extremity of said shaft extending into the mixing chamber said chamber having a slot formed therein in which the shaft extremity is received and constrained to move in only one plane, said cam means presenting two opposite cam surfaces formed on a hemispherical body, each of said cam surfaces being defined at one side thereof by a great circle whose center lies in a plane passing through the center of the said pivoted shaft, each of the cam surfaces further being defined along another side thereof by a small circle formed by a plane passing through the hemispherical body at a point outside the center of the pivoted shaft, the two cam surfaces being separated by stop members projecting outwardly from the hemispherical body.

5. A mixing valve of the character described, comprising a mixing chamber, valve and spring means for controlling movement of materials through the chamber, said valve means including valve stems extending into the mixing chamber, rotatable cam means cooperating with the valve and spring means for selectively opening and closing the valve means, said cam means being supported on a shaft pivoted at one side of the mixing chamber, the inner extremity of said shaft extending into the mixing chamber said chamber having a guideway formed therein in which the shaft extremity is received and constrained to move in only one plane, said cam means presenting two opposite cam surfaces formed on a hemispherical body, each of said cam surfaces being defined at one side thereof by a great circle whose center lies in a plane passing through the center of the said pivoted shaft, each of the cam surfaces further being defined along another side thereof by a small circle formed by a plane passing through the hemispherical body at a point outside the center of the pivoted shaft, the two cam surfaces being separated by stop members projecting outwardly from the hemispherical body, and said cam members including areas adjacent to the cam surfaces having an arc of curvature whose radius measured relative to the center of the pivoted shaft is less than the distance between the center of the pivoted shaft and one of said valve stems.

6. A mixing valve of the character described comprising a casing having a chamber therein, valve means for controlling movement of materials through the chamber, a shaft extending through the chamber supported on a ball pivot, cam means mounted on the shaft between the ball pivot and the inner extremity of the shaft, said cam comprising a hemispherical body which presents two opposite and similar cam surfaces, the radial distance between the ball pivot and the cam surfaces increasing progressively in two directions of the hemispherical body, said hemispherical body being formed with recessed areas which border upon the cam surfaces, said recessed areas at all points therealong being spaced away from the center of the ball pivot a distance less than the radial distance measured between the center of the ball pivot point and any point along said cam surfaces.

7. An article of the character described, comprising a casing member having a mixing chamber provided therein, inlet ports for admitting fluid material to the chamber, valve means mounted in the ports for opening and closing same, said valve members presenting valve stems which project into the mixing chamber in spaced-apart relation to one another, the valve stems being arranged in a position such that their axes lie along two converging lines, a conduit communicating with the mixing chamber for emitting fluids therefrom, said casing presenting at one side an opening in which is secured a removable cap, a shaft member extending through the cap and having fixed thereto a ball member, said ball being supported in a socket formed in the cap, the inner surface of the casing being formed with a channel extending therealong between the said valve members, the inner extremity of the shaft member being slidably supported in the said channel, a cam member fixed on the shaft at points intermediate its inner extremity and the said ball, said cam member consisting of a hemispherical body having an exterior peripheral surface formed with two similar cam surfaces, said surfaces being separated by arcuate stop members lying in opposed relation to one another, the cam surfaces constituting hemispherical areas, the radial distance measured between the center of the said ball and the said hemispherical areas increasing progressively in two directions of the hemispherical body, said hemispherical surfaces being adapted upon movement of the shaft member to engage with the said valve stem tips and open the valves to a variable extent.

8. An article of the character described comprising a casing having a mixing chamber provided therein, inlet ports for admitting fluid to the chamber, valve means mounted in the ports for opening and closing the same, said valve members presenting valve stems which project into the mixing chamber in spaced-apart relation from one another, the valve stems being arranged in a position so chosen that their axes lie along two converging lines, a conduit connecting with the mixing chamber for emitting fluid material therefrom, a shaft member supported on a ball pivot element mounted in the side of the casing, the inner surface of the casing being formed with a channel extending between the said valve members, an inner extremity of the shaft member being slidably supported in the said channel to limit the arc of rotation of the shaft member in one direction, a cam member fixed on the shaft at a point intermediate to its inner extremity and the said ball pivot element, said cam member consisting of a hemispherical body having exterior peripheral surfaces which present two annual zones; said zones arranged to occur in spaced-apart relation to the tips of said valve stems in all positions of the shaft member, portions of the hemispherical body adjacent to the annular zones being formed with two similar cam surfaces which are separated by stop members, the radial distance measured between the center of the ball and said cam surfaces increasing progressively in two directions of the hemispherical body and exceeding in variable degree the distance between the ball and one of said valve extremities, said areas being adapted upon rotation of the shaft to engage with the said valve stem tips and open the valves proportionately.

STEPHEN R. PUTNAM.

REFERENCES CITED

The following references are of record in the file of this patent:

UNITED STATES PATENTS

| Number | Name | Date |
|---|---|---|
| 874,737 | Bucklin | Dec. 24, 1907 |
| 963,221 | Haynes | July 5, 1910 |
| 1,095,003 | Leonard | Apr. 28, 1914 |
| 1,280,616 | Lawler | Oct. 1, 1918 |
| 1,517,956 | Compton | Dec. 2, 1924 |
| 2,040,663 | Mallet | May 12, 1936 |
| 2,075,917 | Vorech | Apr. 6, 1937 |
| 2,205,684 | Cochran | June 25, 1940 |
| 2,409,765 | Kehle | Oct. 22, 1946 |
| 2,451,162 | Gates | Oct. 12, 1948 |